Jan. 16, 1968   M. A. ZALESKI   3,364,303

MINERAL INSULATED CABLE FITTING

Filed June 15, 1964

INVENTOR
Matthew A. Zaleski
BY
Emery Whittemore,
Sandoe & Graham
ATTORNEYS.

United States Patent Office 3,364,303
Patented Jan. 16, 1968

3,364,303
MINERAL INSULATED CABLE FITTING
Matthew A. Zaleski, Scotch Plains, N.J., assignor to General Cable Corporation, New York, N.Y., a corporation of New Jersey
Filed June 15, 1964, Ser. No. 375,224
10 Claims. (Cl. 174—76)

This invention relates to terminal fittings for mineral insulated cable. Such cables have bare conductors surrounded by mineral electrical insulation enclosed in a metal, usually a copper tube.

Terminal fittings used with mineral insulated cable must be constructed so as to prevent moisture from working its way into the insulation; and it is an object of this invention to provide an improved terminal fitting for mineral insulated cable.

Another object is to provide a mineral insulated cable terminal fitting that is of simpler construction; that is more convenient and more economical to use; and that can be disconnected and reassembled if necessary.

The invention utilizes a compression ring that is of continuous circumferential extent and that is made with a low angle of taper corresponding to the taper of a complementary face of a gland body that has a nut for producing relative axial movement of the ring and gland to obtain the high compression that the fitting relies upon to obtain a seal against moisture.

Other objects, features and advantages of the invention will appear or be pointed out as the description proceeds.

In the drawing, forming a part hereof, in which like reference characters indicate corresponding parts in all the views.

Figure 1:
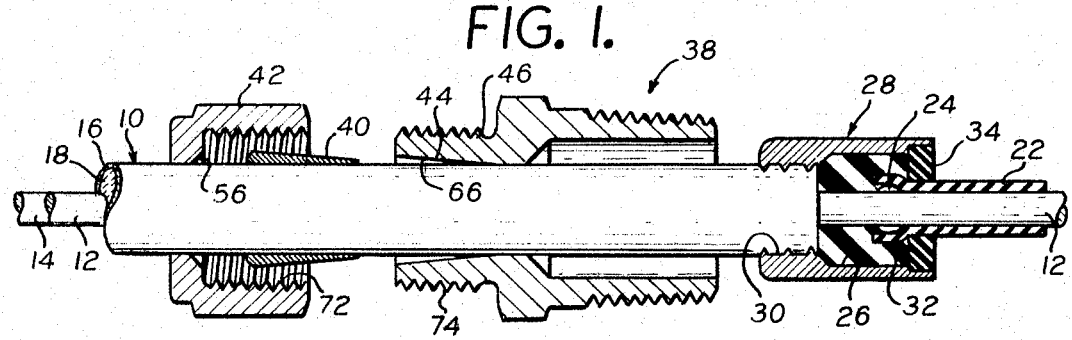
FIGURE 1 is a view showing an end portion of a mineral insulated cable and the parts of the terminal fitting of this invention, before the parts are assembled.
Figure 2:
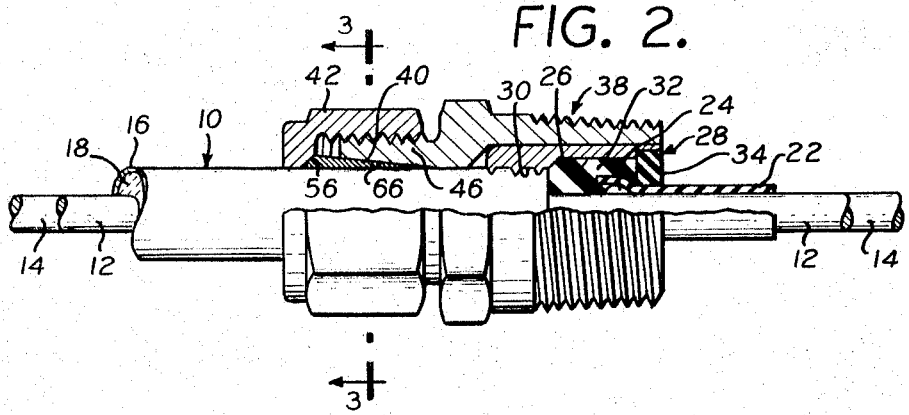
FIGURE 2 is a view, mostly in section, showing the structure of FIGURE 1 after the parts have been assembled on the mineral insulated cable.
Figure 3:
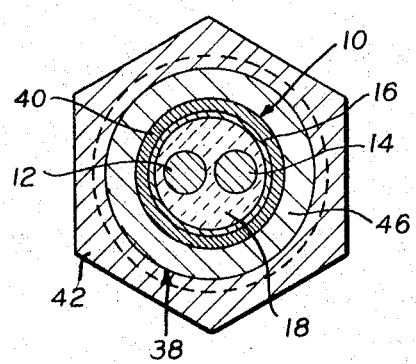
FIGURE 3 is a sectional view taken on the line 3—3 of FIGURE 2.

A mineral insulated cable 10 includes two conductors 12 and 14 located in a metal tube 16, and with ceramic insulating material 18 located in the tube 16 between the conductors 12 and 14 and between the conductors and the inside wall of the tube 16. This is a well known type of electric cable. The conductors 12 and 14 are commonly made of copper and the tube 16 of copper. No further explanation of the construction of the cable is necessary for a complete understanding of this invention.

At the termination of the cable, the tube or metal sheath 16 terminates short of the end of the conductors 12 and 14. Each of the conductors 12 and 14 has an insulating sleeve 22 covering the portion, or at least most of the portion of the conductor which extends beyond the metal sheath 16. The insulating sleeve 22 is secured to the bare metal surface of the conductor 12 or 14 by an anchoring bead 24 and this anchoring bead is spaced from the end of the metal sheath 16 by a distance less than the depth of a counter bore 26 in a pot 28.

The pot 28 has a threaded opening 30 which screws over the end of the metal sheath 16. The threads on the pot 28 cut their own threads on the circumference of the metal sheath 16 as the pot is forced on the sleeve.

The space within the counter bore 16 is filled with potting or sealing compound 32; and the end of the counter bore 28 is closed by an insulating cap 34 which may screw into a wider counter bore at the mouth of the counter bore 26, but which preferably fits into the wider counter bore with a press fit.

The terminal fitting includes also a gland consisting of a gland body 38, a compression ring 40 and a gland nut 42. These three elements are placed on the sheath 16 before the pot 28 is assembled with the end of the sheath.

After the pot 28 has been secured to the metal sheath 16 and the sealing compound has been placed in the counter bore 26 and the insulating cap 34 has been brought into place; the gland body 38 is advanced along the metal sheath 16 until it covers the pot 28. The compression ring 40 is then slid along the metal sheath and is pushed into a clearance 44 between the metal sheath 16 and a threaded portion 46 of the gland body.

Figure 4:
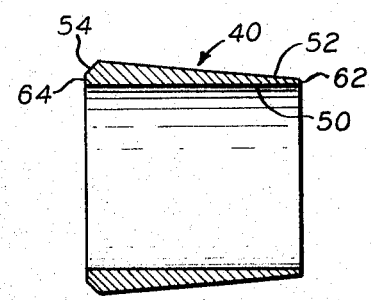
FIGURE 4 is an enlarged detail sectional view of a portion of the clamping ring.

The compression ring 40, which is best shown in FIGURE 4, has a cylindrical inside surface 50 of a diameter substantially equal to the outside diameter of the metal sheath 16 of the cable. The ring 40 is free to slide on the metal sheath but otherwise it is a close fit around the metal sheath. The terminal fitting is made of brass, and preferably free cutting brass.

There is a long tapered surface 52 on the outside of the compression ring 40 and a short tapered face 54 at the large end of the taper of the face 52. The face 52 has a low angle of taper so as to have great mechanical advantage when forced axially into the clearance 44 (FIGURE 1) by the clamping nut 42. There is an annular abutment surface 56 on the clamping nut 42 in position to contact with the face 54 of the compression ring 40 to force the ring 40 to move axially along the sheath 16.

Referring again to FIGURE 4, the ring 40 has an annular end face 62 at the small end of the tapered face 52 and has an annular end face 64 at the small end of the taper of the face 54. The gland body 38 has a tapered inside face 66 which has substantially the same angle of taper as the tapered face 54 of ring 40, and in the preferred construction the angle of taper of the faces 52 and 66 is exactly the same.

The tapered face 66 preferably extends all the way to the surface of the metal sheath 16; that is, there is no end wall for the clearance space 44 comparable to the end wall 62 (FIGURE 4) of the ring 40. If there is an end face at the small end of the tapered face 66 of the gland body 38, it should be of less radial extent than the end face 62. The object is to have the pressure between the gland body 38 and the ring 40 exerted through the confronting tapered faces 52 and 66 and not through the end face 62 of the ring and any confronting face of the gland body 38.

The nut 42 has threads 72 which screw over complementary threads 74 on the outside of the threaded portion 46 of the gland body 38. The nut 42 has a non-circular peripheral surface for receiving a wrench, and so does the mid portion of the gland body 38. As the nut 42 is screwed over the threads 74 in one direction, the abutment surface 56 in the nut 42 forces the compression ring 40 axially along the metal sheath 16 and against the tapered inside face 66 of the gland body 38. Continued pressure by the nut 42 against the compression ring 40 sets up a high radial pressure between the tapered face 66 of the gland body 38 and the outside tapered face 52 of the compression ring 40.

This compression of the ring 40 clamps the metal sheath 16 and forms a joint which is under such high pressure that no moisture can penetrate between the confronting faces 52 and 66 and between the inner face 50 of the nut 44 and the circumferential surface of the metal sheath 16.

In addition to providing a moisture-proof joint, the fitting of this invention also provides a flameproof connection. In order to have the connection flameproof, the length of the clamping surfaces 52 and 66 and the corresponding surfaces between the inside face 50 of the ring 40 and the outside of the sheath 16 must have an axial length of at least ⅜″ and the joint must be one between which a 0.0015″ feeler gauge will not enter more than ⅛″ at any point around the circumference of the sheath.

The ring 40 is continuous around its entire circumference so that the pressure is uniformly distributed and there is no scoring of the outside surface of the metal sheath 16. The pressure of the ring 40 does indent the surface of the metal sheath 16 but this indentation is not beyond the limit of elasticity of the sheath 16 and when the fitting is disassembled, the metal springs back to its original position. Thus, the fitting can be disassembled and reused if necessary.

The preferred embodiment of the invention has been illustrated and described but changes and modifications can be made and some features can be used in different combinations without departing from the invention as defined in the claims.

What is claimed is:

1. In a termination fitting for use with a mineral insulated cable which includes an electrical conductor, a metal sheath terminating short of the end of the conductor, inorganic electrically insulating material compressed between the conductor and the sheath, a pot having an opening therein with screw threads that screw over and onto an end of the sheath, an insulating sleeve extending over the conductor where the conductor extends beyond the sheath, said sleeve extending through and beyond the pot, and plastic insulating compound filling the pot around the sleeve, said termination fitting including in combination a gland body into which the pot will fit and in which the pot will be held, a portion of the gland body extending along the sheath and having a progressively increasing clearance from the sheath in a direction away from the end of the sheath, a compression ring of continuous circumferential extent, the ring having a cylindrical inside surface that fits snugly over the sheath and an axially tapered outside surface that matches the taper of the clearance of the gland body from the sheath, the ring having end faces at both ends of said axially tapered outside surface, the end face of the ring at the small end of said tapered surface being out of contact with the gland body, threads on the outside of the gland body, and a gland nut having a rearward clamping portion that surrounds the sheath closely and with an abutment surface that bears against the end face of the large end of the ring, the gland nut having threads that fit over the threads on the outside of the gland body for advancing the nut axially along the sheath to compress the ring in the tapered clearance between the sheath and the gland body with a uniform circumferential pressure extending entirely around the cable sheath, the unit pressure of the gland against the outside of the ring multiplied by the cosine of the angle of taper of the ring being greater than the yield strength of the sheath plus the hoop strength of the continuous ring, but less than the ultimate compressive strength of the sheath plus the hoop strength of the continuous ring, all pressures being in pounds per square inch or equivalent ratios.

2. The combination described in claim 1 characterized by the ring extending beyond the end of the gland body at the thicker end of the ring but for an axial distance substantially less than the axial length of the ring that is located in the clearance between the sheath and the gland body.

3. The combination described in claim 2 characterized by the angle of taper of the outside surface of the ring being equal to that of the inside surface of the gland body that confronts the sheath across said clearance, the end of the ring against which the abutment surface of the nut bears having a taper in the other direction and at a much larger angle to the axis of the sheath than the taper of the ring surface in the clearance, and the abutment surface of the nut being of a complementary taper to that of the large end of the ring.

4. The combination described in claim 2 characterized by the taper of the outside surface of the ring that extends into said clearance being approximately 4 degrees making an included angle across the full diameter of the ring of approximately 8 degrees.

5. The combination described in claim 4 characterized by the taper of the end of the ring that bears against the abutment surface of the nut being approximately 45 degrees making an included angle of 90 degrees across the full diameter of the ring.

6. The combination described in claim 1 characterized by the ring having an end face at its thinner end with a radial thickness substantially greater than the clearance between the gland body and the sheath at the smaller end of said clearance.

7. The combination described in claim 3 characterized by the ring having faces at both ends beyond the tapered surfaces of the ring.

8. The combination described in claim 1 characterized by the sheath being made of copper and the ring being made of brass.

9. The combination described in claim 8 characterized by the gland body, ring and nut all being made of free-cutting brass.

10. The combination described in claim 1 characterized by the ring forming with the sheath a flame proof path having an axial length of at least three eighths inch and a joint between which a 0.0015 inch feeler gauge will not enter more than one-eighth inch at any point around the circumference of the sheath.

References Cited

UNITED STATES PATENTS

| | | | |
|---|---|---|---|
| 2,858,358 | 10/1958 | Hawke | 174—89 |
| 2,856,451 | 10/1958 | Appleton | 174—77 |
| 3,040,284 | 6/1962 | Connell | 174—77 X |
| 3,244,796 | 4/1966 | Stark et al. | 174—77 |

FOREIGN PATENTS 645,797   11/1950   Great Britain.

LARAMIE E. ASKIN, *Primary Examiner.*

J. RUGGIERO, H. HUBERFELD, *Assistant Examiners.*